United States Patent
Le Guelvouit et al.

(10) Patent No.: US 12,327,294 B2
(45) Date of Patent: Jun. 10, 2025

(54) METHOD FOR INSERTING INFORMATION INTO AN IMAGE AND CORRESPONDING DEVICE

(71) Applicant: FONDATION B-COM, Cesson-Sévigné (FR)

(72) Inventors: Gaëtan Le Guelvouit, Thorigné-Fouillard (FR); Valérie Denis, La Bouëxière (FR)

(73) Assignee: FONDATION B-COM, Cesson-Sévigné (FR)

( * ) Notice: Subject to any disclaimer, the term of this patent is extended or adjusted under 35 U.S.C. 154(b) by 607 days.

(21) Appl. No.: 17/639,720

(22) PCT Filed: Sep. 2, 2020

(86) PCT No.: PCT/EP2020/074457
§ 371 (c)(1),
(2) Date: Mar. 2, 2022

(87) PCT Pub. No.: WO2021/043817
PCT Pub. Date: Mar. 11, 2021

(65) Prior Publication Data
US 2022/0292624 A1    Sep. 15, 2022

(30) Foreign Application Priority Data
Sep. 6, 2019   (FR) ........................................ 1909841

(51) Int. Cl.
*G06T 1/00*    (2006.01)

(52) U.S. Cl.
CPC ............ *G06T 1/0028* (2013.01); *G06T 1/005* (2013.01); *G06T 2201/0061* (2013.01)

(58) Field of Classification Search
CPC ................... G06T 1/0028; G06T 1/005; G06T 2201/0061; G06T 2201/0051; G06T 2201/0065
See application file for complete search history.

(56) References Cited

U.S. PATENT DOCUMENTS
6,304,966 B1   10/2001   Shimizu

FOREIGN PATENT DOCUMENTS
KR   20030094498 A  *  12/2003  ............ G06T 1/0057
WO   WO-2004095828 A1  *  11/2004  ......... H04N 1/32144

OTHER PUBLICATIONS

G. Deore, S. Rajaraman, R. Awate and S. Bakare, "Spectral-spatial hyperspectral image compression based on measures of central tendency," 2015 ICACCI, Kochi, India, 2015, pp. 2226-2232, doi: 10.1109/ICACCI.2015.7275948. (Year: 2015).*

(Continued)

*Primary Examiner* — Bobbak Safaipour
*Assistant Examiner* — Ashley L. Hytrek
(74) *Attorney, Agent, or Firm* — NIXON & VANDERHYE

(57) ABSTRACT

A method for inserting information into a first image including $N1$ rows×$M1$ columns of elements includes: a) obtaining, from the first image, a second image including $N0$ rows×$M0$ columns, $N0 \leq N1$ and $M0 \leq M1$, b) generating initial information including $N0$ rows×$M0$ columns, c) obtaining intermediate information including $N4$ rows×$M4$ columns of elements, so $N4 \geq N1$ and $M4 \geq M1$, and $N4 = kx \cdot N0$ and $M4 = ky \cdot M0$, $kx$ and $ky$ being integers $\geq 1$, the elements organized into blocks, d) obtaining information to be inserted from the intermediate information, including: generating symbols representing noise, including as many symbols as block elements, at least one $<>0$, so the result of a function applied to the symbols=a chosen value, adding (Continued)

each symbol to the corresponding block element, and e) inserting the obtained information into the first image.

19 Claims, 3 Drawing Sheets

(56) References Cited

OTHER PUBLICATIONS

I. J. Cox, J. Kilian, F. T. Leighton and T. Shamoon, "Secure spread spectrum watermarking for multimedia," in IEEE Transactions on Image Processing, vol. 6, No. 12, pp. 1673-1687, Dec. 1997, doi: 10.1109/83.650120. (Year: 1997).*
International Search Report for PCT/EP2020/074457, mailed Nov. 26, 2020, 4 pages.
Cox et al., "Secure Spread Spectrum Watermarking for Multimedia" 1-12 *IEEE Transactions on Image Processing, IEEE Service Center*, vol. 6, No. 12, Dec. 1, 1997.
Cox et al., *Digital watermarking*, Sec. 3.3, Communication-based models of watermarking, p. 68, Morgan Kaufman Publishers.
Cox et al., *Digital watermarking*, Sec. 9.1.6, Preinverting distortions in the embedder, p. 304, Morgan Kaufman Publishers.

* cited by examiner

Fig.4
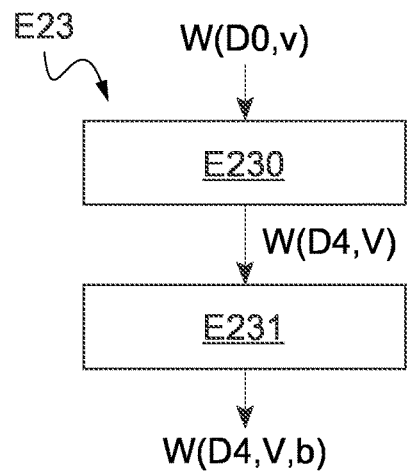
Fig.5
Fig.6
Fig.7
Fig.8
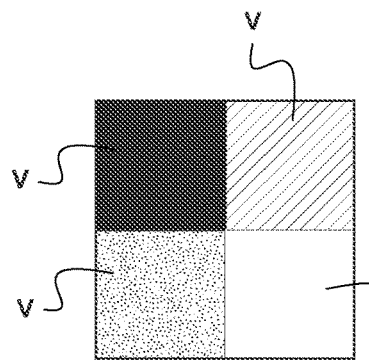
W(D4,V)
E231
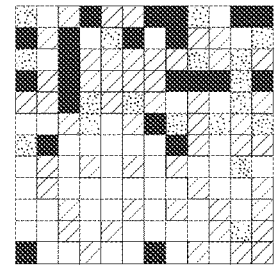
W(D4,V,b)

METHOD FOR INSERTING INFORMATION INTO AN IMAGE AND CORRESPONDING DEVICE

This application is the U.S. national phase of International Application No. PCT/EP2020/074457 filed Sep. 2, 2020, which designated the U.S. and claims priority to FR 1909841 filed Sep. 6, 2019, the entire contents of each of which are hereby incorporated by reference.

TECHNICAL FIELD OF THE INVENTION

The present invention generally relates to the technical field of digital image or video sequence watermarking.

It relates in particular to a method and device for inserting information (also called identification tattoo or watermark) into an image. One goal of this technique is for example to identify the watermarked image's author, thanks to the inserted information.

STATE OF THE ART

It has been proposed to insert into one or several images of a video sequence a digital watermark, that is to say imperceptible and therefore undetectable information, identifying the image or the video in question. It is necessary that this information remains retrievable despite the transformations that might have been applied to the image into which it has been inserted. Different techniques exist. All of them are expressed as a function reflecting the addition of a watermark W to an image I, in such a way that IW=I+W, IW being the watermarked image (see I. J. Cox, M. L. Miller and J. A. Bloom, *Digital watermarking*, Sec. 3.3, Communication-based models of watermarking, p. 68, Morgan Kaufman Publishers.)

In order for the watermark to be robust to scale change such as enlargement, it is known to calculate the information to be inserted in a fixed and reduced size, then to enlarge it to the size of the image to be watermarked. This technique is described for example in the handbook: I. J. Cox, M. L. Miller and J. A. Bloom, *Digital watermarking*, Sec. 9.1.6, Preinverting distortions in the embedder, p. 304, Morgan Kaufman Publishers.

However, the enlargement step of this solution generates uniform solid areas in the watermarked image, once the watermark inserted, whatever the enlargement method used. These areas (in particular, the brightness transitions between two adjacent solids) are easily visible, which make the watermark detectable.

DISCLOSURE OF THE INVENTION

In this context, the invention proposes a method for inserting information into a first image comprising $N1$ rows×$M1$ columns of elements, $N1$ and $M1$ being non-zero integers, said method comprising the following steps:
  a) obtaining, from the first image, a second image comprising $N0$ rows×$M0$ columns of elements, $N0$ and $M0$ being non-zero integers such that $N0 \leq N1$ and $M0 \leq M1$,
  b) generating, from the second image, initial information comprising $N0$ rows×$M0$ columns of elements,
  c) obtaining, from the initial information generated, intermediate information comprising $N4$ rows×$M4$ columns of elements, in such a way that $N4 \geq N1$ and $M4 \geq M1$ on the one hand, and $N4=kx \cdot N0$ and $M4=ky \cdot M0$ on the other hand, $N4$ and $M4$ being non-zero integers, $kx$ and $ky$ being integers higher than or equal to 1, said elements of the intermediate information being organized into blocks,
  d) obtaining said information to be inserted from the intermediate information, comprising, for at least one block of the intermediate information,
    generating a sequence of symbols representative of a noise, comprising as many symbols as there are elements in said block, at least one of the symbols being non-zero, such that the result of a predetermined function applied to said symbols is equal to a chosen value,
    adding each symbol to the corresponding element of said block, and
  e) inserting said obtained information into the first image.

The invention has for advantage to allow the insertion of information that is robust to a scale change of the image into which it has been inserted, and that does not generate solid in the watermarked image.

For example, the result can be a sum.

The predetermined function may be a measure of central tendency.

For example, the predetermined function may be the median.

For example, the predetermined function may be the average.

As an alternative, the predetermined function (applied to the symbols) may be the sum (of the symbols).

The intermediate information is for example obtained from the initial information by means of an enlargement method (for example, by means of a Nearest Neighbor Interpolation method).

According to one mode of implementation, said chosen value is equal to zero; moreover, it may be provided, for example, that $kx$ or $ky$ is higher than or equal to 2.

According to one mode of implementation, if $N4>N1$ or if $M4>M1$, obtaining the information to be inserted further comprises, after adding each symbol to the corresponding element of said block, a size reduction of the intermediate information in such a way as to obtain $N4=N1$ or $M4=M1$, respectively.

According to one mode of implementation, said sequence of symbols representative of the noise comprises $p$ symbols, with $p1$ symbols randomly or pseudorandomly generated and $p2$ symbols calculated in such a way that the result of the predetermined function applied to the $p$ symbols is equal to said chosen value, $p$, $p1$ and $p2$ being integers such that $p=p1+p2$.

The invention also proposes, according to another aspect, a method for extracting information formed of a plurality of elements comprising $N0$ rows and $M0$ columns, inserted into an image comprising $N2$ rows×$M2$ columns of elements using the insertion method according to one of the modes of implementation described hereinabove, $N0$, $M0$, $N2$ and $M2$ being non-zero integers, such that $N2>N0$ and $M2>M0$, said insertion method comprising the following steps:
  f) obtaining, from said image, a new image comprising $N3$ rows and $M3$ columns of elements, with $N3 \geq N2$ and $M3 \geq M2$ on the one hand, and $N3=nx \cdot N0$ and $M3=ny \cdot M0$ on the other hand, $N3$ and $M3$ being non-zero positive integers, $nx$ and $ny$ being integers higher than 1, the elements of said new image being organized into blocks,
  g) obtaining a reduced image from the new image, the reduced image comprising $N0$ rows×$M0$ columns of elements, each element of the reduced image being obtained from the elements of a corresponding block in the new image, and for each element of the reduced image to be obtained:

determining the value of the considered element by applying said predetermined function to the values of the elements of the new image block corresponding to said element, the value of said considered element corresponding to the result of application of the function, and h) extracting the information from the reduced image.

The invention also proposes, according to another aspect, a device for inserting information into a first image comprising N1 rows×M1 columns of elements, N1 and M1 being non-zero integers, the device being configured to implement the following steps:

i) obtaining, from the first image, a second image comprising N0 rows×M0 columns of elements, N0 and M0 being non-zero integers such that N0≤N1 and M0≤M1, j) generating, from the second image, initial information comprising N0 rows×M0 columns of elements, k) obtaining, from the initial information generated, intermediate information comprising N4 rows×M4 columns of elements, in such a way that N4≥N1 and M4≥M1 on the one hand, and N4=kx·N0 and M4=ky·M0 on the other hand, N4 and M4 being non-zero integers, kx and ky being integers higher than or equal to 1, said elements of the intermediate information being organized into blocks, l) obtaining said information to be inserted from the intermediate information, comprising, for at least one block of the intermediate information, generating a sequence of symbols representative of a noise, comprising as many symbols as there are elements in said block, at least one of the symbols being non-zero, such that the result of a predetermined function applied to said symbols is equal to a chosen value, adding each symbol to the corresponding element of said block, and m) inserting said obtained information into the first image.

The invention also proposes, according to another aspect, a device for extracting information formed of a plurality of elements comprising N0 rows and M0 columns, inserted into an image comprising N2 rows×M2 columns of elements using the insertion method according to one claims 1 to 7, N0, M0, N2 and M2 being non-zero integers, such that N2>N0 and M2>M0, the device being configured to implement the following steps:

n) obtaining, from said image, a new image comprising N3 rows and M3 columns of elements, with N3≥N2 and M3≥M2 on the one hand, and N3=nx·N0 and M3=ny·M0 on the other hand, N3 and M3 being non-zero positive integers, nx and ny being integers higher than 1, the elements of said new image being organized into blocks, o) obtaining a reduced image from the new image, the reduced image comprising N0 rows×M0 columns of elements, each element of the reduced image being obtained from the elements of a corresponding block in the new image, and for each element of the reduced image to be obtained:

determining the value of the considered element by applying said predetermined function to the values of the elements of the new image block corresponding to said element, the value of said considered element corresponding to the result of application of the function, and p) extracting the information from the reduced image.

The invention also proposes, according to another aspect, a computer-readable recording medium, on which is recorded a computer program comprising program code instructions to carry out the steps of the method as described hereinabove.

Of course, the different features, alternatives and embodiments of the invention can be associated with each other according to various combinations, insofar as they are not mutually incompatible or exclusive.

DETAILED DESCRIPTION OF THE INVENTION

Moreover, various other features of the invention will be apparent from the appended description made with reference to the drawings that illustrate non-limitative embodiments of the invention, and wherein:

FIG. 4 shows in more detail a step of the mode of implementation of FIG. 2;

FIG. 5 illustrates an element implemented in the step shown in FIG. 4;

FIG. 6 illustrates a block implemented in the step shown in FIG. 4;

FIG. 7 illustrates the block of FIG. 6, after addition of a noise;

FIG. 8 shows an example of rendering of information to be inserted;

Figure 1:
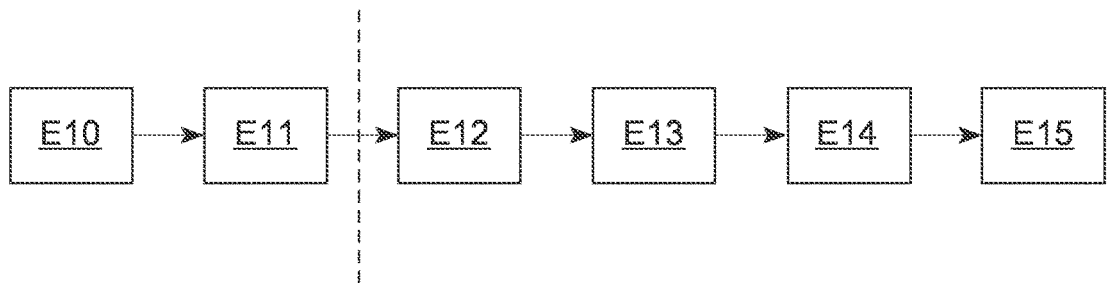
FIG. 1 illustrates an exemplary application of a mode of implementation of the information insertion and extraction methods according to the invention.

FIG. 1 describes an exemplary application of a mode of implementation of the information insertion and extraction methods according to the invention. A first step E10 implements a method for inserting information into an image. This information can for example be a mark making it possible to recognize the image's author for purpose of copyright protection of the image. As an alternative, the information (called hereafter "watermark") can be inserted into one or several images of a video sequence.

Once the information inserted into the image, the latter can be transmitted during a step E11, then received by a client at step E12. The image can then be transformed by the client, who can perform, for example, a scale change, at step E13.

The information that has been inserted at step E10 is extracted from the transformed image, step E4, then analyzed, for example to identify the image's author, step E15.

Figure 2:
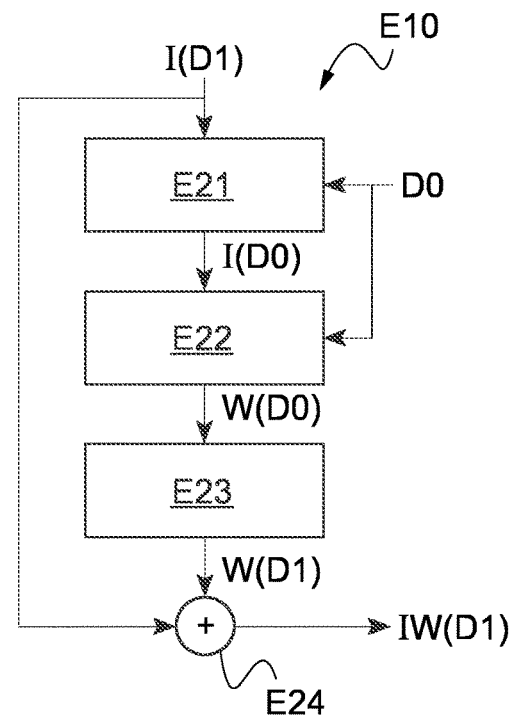
FIG. 2 shows a mode of implementation of an insertion method according to the invention.

FIG. 2 illustrates in more detail an exemplary mode of implementation of the method of inserting information into an image, step E10.

Let's consider an image I(D1) formed of several elements, for example pixels, distributed into N1 rows and M1 columns, N1 and M1 being non-zero integers representing the size D1 of the image I(D1). This size can be expressed as a product of N1×M1 pixels. For example, size D1 can be equal to 3840×2160 pixels.

From this image, another image I(D0) is obtained, which is formed of elements distributed into N0 rows and M0 columns, N0 and M0 being non-zero integers representing the size D0 of the image I(D0). It comes that N0≤N1 and/or M0≤M1, corresponding to the 16/9 image format.

Size D0 is predetermined, for example equal to 640*360 pixels, corresponding to the so-called 360 p definition. Preferably, size D0 is chosen in such a way that the ratio between the number of rows and columns corresponds to a standard image format such that the 16/9 image format. For example, this size D0 may imply a number of pixels corresponding to a standard SD definition, i.e. 480 p. More generally, in the context of the invention described hereinafter, size D0 is chosen small enough for the watermark to remain robust to the image reductions to formats of acceptable quality from a viewer's point of view, and great enough for the watermark energy to remain low compared to the energy of the host image. It is reminded that, conventionally, in the field of signal processing, the energy of an image corresponds to the variance of the pixel values with respect to a constant value.

From this image I(D0), a watermark W(D0) (or initial information) is generated, step E22. The watermark W(D0) is also formed of pixels distributed into rows and columns. Methods for calculating a watermark at a given size from an image having this same size are known by the person skilled in the art. Calculation methods are described for example in the above-mentioned handbook *Digital watermarking*. It is this initial information that will thereafter be extracted in order to be analyzed.

From this watermark W(D0), an enlarged watermark W(D4) is obtained in such a way as to have N4 rows and M4 columns (size D4), step 23, according to one mode of implementation of the method of the invention. It comes that N4≥N1 and M4≥M1 on the one hand, and N4=kx·N0 and M4=ky·M0 on the other hand, N4 and M4 being non-zero integers, kx and ky being integers higher than or equal to 1. This step 23 is described in more detail hereinafter.

Preferably, the sizes N4 and M4 are slightly higher than N1 and M1. For example, if N1=rx·N0 and M1=ry·M0 (rx and ry being numbers higher than 1), N4 and M4 can be chosen in such a way that N4=(E(rx)+1)·N0 and M4=(E(ry)+1)·M0, E(·) corresponding to the "integer part" function. For example, if D1=3840*2160 pixels, we may have D4=4480*2520 pixels.

If N4>N1 or M4>M1, step 23 further comprises reducing the size D4 of the watermark W(D4) in such a way that N4=N1 and M4=M1.

Finally, the enlarged watermark W(D4) is inserted into the image I(D1), step 24, in such way as to obtain the watermarked image IW(D1). The insertion of the enlarged watermark W(D4) into the image I(D1) is made for example by addition, that is to say by adding the values of the pixels in the watermark W(D4) to the values of the corresponding pixels in the image I(D1). The enlarged watermark, once inserted, is hence superimposed to the image.

The image I(D1) can be a fixed image or one of the images of a video sequence, several images (or even all the images) of the video sequence being potentially watermarked.

As an alternative, the image can be a color component, such as the luminance or a chrominance component. Each color component is formed of elements, one element corresponding to the color component of one pixel.

Figure 3:
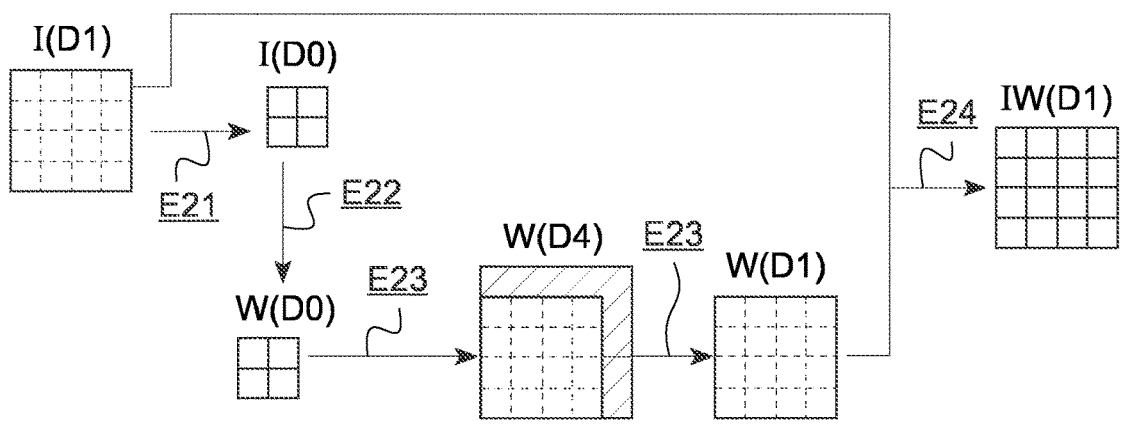
FIG. 3 illustrates the mode of implementation of FIG. 2.

FIG. 3 schematically illustrates the size changes implemented during the various steps. It is considered in this figure, for simplification purpose, that the first image I(D1) is formed of 4*4 pixels. At step E21, the second image I(D0) at the second size D0, whose value is equal to 2*2 pixels, is obtained from the first image I(D1).

The watermark W(D0) formed of 2*2 pixels is generated from this image I(D0), step E22. Then, the watermark is enlarged to size D4. If N4>N1 or M4>M1, step 23 further comprises, as illustrated in FIG. 3, reducing the size in such a way to have N4=N1 and M4=M1.

Finally, the watermark W(D1) is inserted into the image I(D1). And the watermarked image IW(D1) formed of 4*4 pixels is obtained, step 24. FIG. 4 illustrates in more detail the step of scaling the watermark, E23. The scaling is made in two phases. Let's consider an element having the value v belonging to the watermark at the second size W(D0,v), as illustrated in FIG. 5. Using a known enlargement method, for example the so-called Nearest Neighbor Interpolation (NNI) method, with an integer enlargement factor sx for the rows and sy the columns, a block V of sx*sy elements v is obtained, at step E230. For example, for the sake of simplification, it is considered here an enlargement factor such that sx=sy=3, in such a way that the resulting block comprises 3*3 elements, i.e. nine elements in all, as illustrated in FIG. 6. The enlarged watermark W(D4,V) (intermediate information) is obtained.

Then, for at least one block V of the enlarged watermark, a noise b is then generated with as many symbols b[i] as elements in the block V (i being an integer such that 1≤i≤(sx*sy)). At least one of these symbols b[i] is different from zero. The noise, and in particular the noise distribution, is generated in such a way that the result of a predetermined function applied to the symbols b[i] is equal to a same value chosen for the considered block, whatever the values taken by these symbols b[i].

In the example described, the predetermined function is a measure of central tendency (applied to the symbols b[i]), here the average of the symbols b[i] or, as an alternative, the median of the symbols b[i].

For example, the values taken by the symbols can be comprised between −50 and 50, i.e. in the interval [−50; 50].

For example, the noise distribution can be a Gaussian distribution.

Preferably, said resulting value is chosen in such a way that the energy of the enlarged watermark does not exceed a predetermined threshold related to the energy of the host image. In the following of the description, it is considered, unless otherwise specified, that this chosen value is zero. In this case in particular, the predetermined function (applied to the symbols b[i]) can be the sum of the symbols b[i].

Preferably, the noise is added to all the blocks of the watermark, in such a way that the watermarked image has a better visual quality. The blocks are then processed successively in a predetermined processing order.

The noise can be produced by means of a random or pseudorandom number generator ((P)RNG). The pseudorandom generators produce a sequence of mixed bits that depends on an initial seed. The latter must be initialized with a different value at each use. This initial value can be for example the hour of the system used, in milliseconds. Each run of the program will use a different seed, which will produce a different random sequence. Conversely, the reuse of the same seed gives the same sequence of pseudorandom bits. The random generators produce bit sequences in a fully random manner, the bits being chosen independently and uniformly, at random. Each bit sequence produced by a new generation is hence different from the previous ones.

Preferably, according to one mode of implementation of the invention, if the noise sequence includes p symbols (p is an integer higher than 1, which in this example is equal to sx*sy), only p1 symbols with p1<p (p1 being an integer higher than or equal to 1) are generated using the above-described generator. The p2 remaining symbols (p2 being an integer higher than or equal to 1, with p2<p) are determined or calculated in such a way that the result of the predetermined function applied to the p symbols are equal to the value chosen for the considered block. It comes that p1+p2=p. For example, if p=9, p1 can be chosen equal to 7 and p2 equal to 2.

The predetermined function preferably comprises an addition; as already mentioned, the predetermined function is for example a measure of central tendency (such as an average or a median), or, as an alternative, a variance, this list being not limitative. In this case, the chosen value hence corresponds to a sum, resulting from the addition of the symbols b[i].

If the chosen value is equal to zero, in this case, if the applied function is the average function, then the average (and hence the sum) of the values taken by the noise components for the considered block is zero. The average of the noise components for the whole image is hence also zero.

The noise components are respectively added to each element of the block V in such a way as to obtain the enlarged and noisy watermark W(D4,V,b) as illustrated in FIG. 7. If D4=D1, the information can be inserted into the image to be watermarked I(D1). If D4>D1, the information must be reduced before being inserted into the image. The inventors have noted that the fact to use a size D4 higher than that of the image D1, then to reduce it before inserting the watermark, would make the visual impact of the watermark on the watermarked image more visually acceptable because homogeneous.

From one block to another and from one image to another, the noise components can take different values. This is made possible by changing the noise generator or the initial seed, as explained hereinabove. Hence, from a same initial watermark of size D0, it is possible to generate several watermarks to be inserted into different images forming a video sequence. The watermark information thus varies over time, and is therefore very difficult to detect, because it does not follow a regular pattern. On the other hand, the watermark energy has not been reduced because the initial values of the elements have on average not been altered.

The invention also relates to an image watermarked according to a mode of implementation described hereinabove.

FIG. 8 shows an example of rendering for a watermark W(D4,V) formed of four elements after enlargement and the enlarged watermark obtained W(D4,V,b), after insertion of the noise at step E231. In this example, the generated noise follows a normal law. It can be noted that the transition between the elements has disappeared after the noise has been added, thus limiting the appearance of adjacent solids in the watermarked image.

Figure 9:
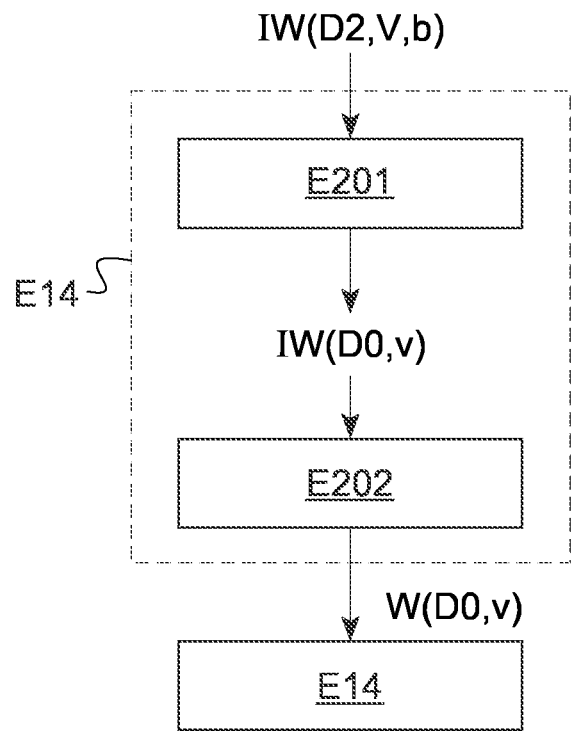
FIG. 9 shows a mode of implementation of an extraction method according to the invention.

FIG. 9 shows a mode of implementation of a watermark extraction from a watermarked image according to the invention, step E14. It is considered that a scale change has been made on the considered watermarked image IW(D2, V,b), the watermarked image from which the watermark has to be extracted having a new size D2, i.e. N2 rows and M2 columns, N2 and M2 being non-zero positive integers.

At step E201, it is searched to bring the size value of the watermarked image IW(D2,V,b) to the values of size D0. Indeed, it is in that size that the watermark can be extracted.

If D2<D0, the watermarked image IW(D2,V,b) is enlarged to the value of the second size D0, for example using the so-called Nearest Neighbor Interpolation method. A scaled watermarked image IW(D0,v,b) is therefore obtained. The scale change that has been made on the watermarked image to bring its size to values lower than size D0 has highly degraded the visual quality of the image, D0 having preferably been chosen to correspond to a standard definition.

If D2>D0, and N2≠nx·N0 or M2≠ny·M0, the watermarked image IW(D2,V,b) is firstly enlarged to a size D3 (N3 rows and M3 columns, N3 and M3 being integers higher than 1). This size has hence values higher than those of size D2, and preferably the nearest, in such a way that N3=nx·N0 and M3=ny·M0 (nx and ny being integers higher than 1). This enlargement can be for example made using a bilinear algorithm. Hence, if the values of the new size are D2=960*800 pixels, those of the second size D0=640*360 pixels, then the watermarked image will be enlarged to size D3, which is 1920*1080 pixels.

If D2>D0 and N2=nx·N0 and N2=ny·M0, the size of the watermarked image IW(D2,V,b) is not enlarged. Size D3 corresponds to size D2.

Then, secondly, once the size of the watermarked image brought back to multiples of size D0, this size D3 of the watermarked image can be reduced to size D0 using the predetermined function. This step will allow the extraction of the watermark at size D0, in order to analyze it, in particular, step E201. To obtain the value of the new element v, the predetermined function that has been used for watermark insertion in step E10 is applied to the values of the elements of each block V of the watermarked image at size equal to D3. For example, the predetermined function can comprise addition of terms, such as average. The value of one pixel of the watermark after reduction is in this case an averaged sum of the pixel values of the corresponding block V of the watermark at size D3. These pixel values of the block V include the values of the noise components that have been added during the watermark insertion. The sum resulting from the averaging of these noise components will be close, or even equal, to the chosen value, for example zero. In this case, the value of the watermark pixel after reduction is then close to an averaged sum of the pixel values of the block V before insertion of the noise components. It is equal to it if the transformations undergone by the watermarked image have had no impact on the values of the noise components added at step E10.

If the chosen value to which the result of application of the predetermined function to the values of the block elements is equal is non-zero, the step E201 can also comprise, for each processed block, subtracting said chosen value from the element value obtained after size reduction. A final value of this element v is hence obtained, which corresponds to an averaged sum of the pixel values of block V before insertion of the noise components.

Application of the predetermined function for size reduction makes it possible to highly reduce (or even cancel) the noise that had been added during the watermark insertion. The watermark W(D0) can then be retrieved at the time of extraction, with, for each of its elements, values close to those taken at the end of step E22. It is then possible to analyze it.

When all the blocks of the image to be processed have been processed in a predetermined order, a watermarked image is obtained, which has the second size D0, the noise that had been added during the watermark insertion having been highly reduced by application of the predetermined function during the change from size D3 to size D0.

It is then possible to extract the watermark in accordance with a known method described for example in the above-mentioned handbook *Digital watermarking*, step E202, then to analyze it, step E14.

Figure 10:
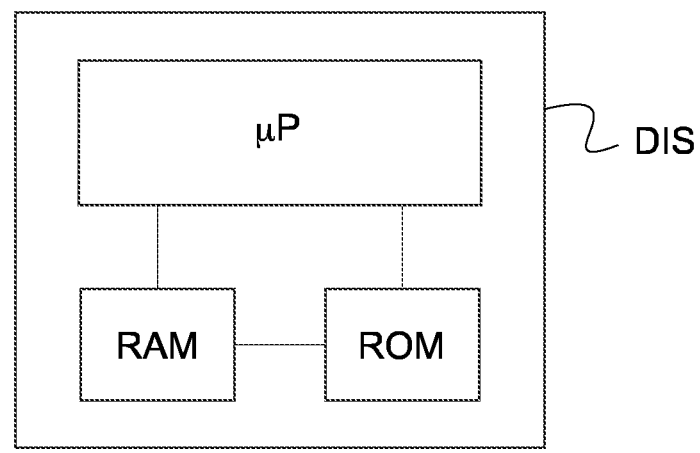
FIG. 10 shows an embodiment of a device according to the invention.

FIG. 10 illustrates a particular way, among several possible, to make a device DIS configured to implement an embodiment of an assistance method according to the invention. The device DIS comprises a random-access memory, for example a RAM, a processing unit µP equipped for example with a processor, and driven by a computer program stored in a read-only memory, for example a ROM or a drive disk. At initialization, the code instructions of the computer program are for example loaded into the RAM before being executed by the processor of the processing unit µP.

FIG. 10 illustrates only a particular manner, among several possible, to make the device DIS in such a way that it performs certain steps of the method according to the invention. Indeed, these steps can be carried out indifferently on a reprogrammable calculation machine (PC, DSP or microcontroller) executing a program comprising a sequence of instructions, or on a dedicated calculation machine (for example, a set of logical gates, such as FPGA or ASIC, or any other hardware module).

In the case where the processing means is formed of a reprogrammable calculation machine, the corresponding program (i.e. the sequence of instructions) can be stored in a storage medium, removable or not, this storage medium being partially or totally readable by a computer or a processor.

The invention hence also relates to the computer program including instructions for implementing the method according to one of the modes of implementation described hereinabove, when said program is executed by a processor.

It goes without saying that the modes of implementation and embodiments described hereinabove are only indicative and not limitative, and that many changes can be easily made by the person skilled in the art without thereby departing from the scope of the invention.

The invention claimed is:

1. A method for inserting information into a first image comprising N1 rows×M1 columns of elements, N1 and M1 being non-zero integers, said method comprising the following steps:
   a) obtaining, from the first image, a second image comprising N0 rows×M0 columns of elements, N0 and M0 being non-zero integers such that N0≤N1 and M0≤M1,
   b) generating, from the second image, initial information comprising N0 rows×M0 columns of elements,
   c) obtaining, from the initial information generated and by way of an enlargement method, intermediate information comprising N4 rows×M4 columns of elements, in such a way that:
   N4≥N1 and M4≥M1, and
   N4=kx·N0 and M4=ky·M0,
   N4 and M4 being non-zero integers, kx and ky being integers greater than 1, said elements of the intermediate information being organized into blocks,
   the enlargement method utilizing an integer enlargement factor sx for the rows and sy for the columns so as to form, from an element v included in the initial information, a block of sx*sy elements v,
   d) obtaining said information to be inserted from the intermediate information, said step of obtaining comprising, for at least one said block of the intermediate information,
   generating a sequence of symbols representative of a noise, the sequence of symbols comprising as many of the symbols as there are said elements in said block, each of the symbols of the sequence corresponding to one of said elements in said block, at least one of the symbols being non-zero, such that a result of a predetermined function applied to said symbols is equal to a chosen value,
   adding each said symbol to the corresponding element of said block, and
   e) inserting said obtained information into the first image.

2. The method according to claim 1, wherein the predetermined function is a measure of central tendency.

3. The method according to claim 1, wherein the predetermined function is the median.

4. The method according to claim 1, wherein the predetermined function is the average.

5. The method according to claim 1, wherein the chosen value is equal to zero, kx or ky being greater than or equal to 2.

6. The method according to claim 1, wherein the intermediate information is obtained from the initial information by means of an enlargement method.

7. A method for inserting information into a first image comprising N1 rows×M1 columns of elements, N1 and M1 being non-zero integers, said method comprising the following steps:
   a) obtaining, from the first image, a second image comprising N0 rows×M0 columns of elements, N0 and M0 being non-zero integers such that N0≤N1 and M0≤M1,
   b) generating, from the second image, initial information comprising N0 rows×M0 columns of elements,
   c) obtaining, from the initial information generated, intermediate information comprising N4 rows×M4 columns of elements, in such a way that:
   N4≥N1 and M4≥M1, and
   N4=kx·N0 and M4=ky·M0,
   N4 and M4 being non-zero integers, kx and ky being integers greater than or equal to 1, said elements of the intermediate information being organized into blocks,
   d) obtaining said information to be inserted from the intermediate information, said step of obtaining comprising, for at least one said block of the intermediate information,
   generating a sequence of symbols representative of a noise, the sequence of symbols comprising as many of the symbols as there are said elements in said block, each of the symbols of the sequence corresponding to one of said elements in said block, at least one of the symbols being non-zero, such that a result of a predetermined function applied to said symbols is equal to a chosen value,
   adding each said symbol to the corresponding element of said block, and
   e) inserting said obtained information into the first image,
   wherein, if N4>N1 or if M4>M1, obtaining the information to be inserted further comprises, after adding each said symbol to the corresponding element of said block, reducing a size of the intermediate information in such a way as to obtain N4=N1 or M4=M1, respectively.

8. The method according to claim 1, wherein said sequence of symbols representative of the noise comprises a number p of the symbols, with a number p1 of the symbols randomly or pseudorandomly generated and a number p2 of the symbols calculated in such a way that the result of the predetermined function applied to the p symbols is equal to said chosen value, p, p1 and p2 being integers such that p=p1+p2.

9. A method for extracting information formed of a plurality of elements comprising N0 rows and M0 columns, inserted into an image comprising N2 rows×M2 columns of elements using the insertion method according to claim 1, N0, M0, N2 and M2 being non-zero integers, such that N2>N0 and M2>M0, said extraction method comprising the following steps:
  f) obtaining, from said image, a new image comprising N3 rows and M3 columns of elements, with:
  N3≥N2 and M3≥M2, and
  N3=nx·N0 and M3=ny.M0,
    N3 and M3 being non-zero positive integers, nx and ny being integers greater than 1, the elements of said new image being organized into blocks,
  g) obtaining a reduced image from the new image, the reduced image comprising N0 rows×M0 columns of elements, each element of the reduced image being obtained from the elements of a corresponding block in the new image, and for each respective element of the reduced image to be obtained:
    determining a value of said respective element by applying said predetermined function to values of the elements of said block in the new image corresponding to said respective element, the value of said respective element being the result of application of the predetermined function, and
  h) extracting the information from the reduced image.

10. A device for inserting information into a first image comprising N1 rows×M1 columns of elements, N1 and M1 being non-zero integers, the device being configured to implement the following steps:
  i) obtaining, from the first image, a second image comprising N0 rows×M0 columns of elements, N0 and M0 being non-zero integers such that N0≤N1 and M0≤M1,
  j) generating, from the second image, initial information comprising N0 rows×M0 columns of elements,
  k) obtaining, from the initial information generated and by way of an enlargement method, intermediate information comprising N4 rows×M4 columns of elements, in such a way that:
  N4≥N1 and M4≥M1, and
  N4=kx·N0 and M4=ky·M0,
    N4 and M4 being non-zero integers, kx and ky being integers greater than 1, said elements of the intermediate information being organized into blocks,
    the enlargement method utilizing an integer enlargement factor sx for the rows and sy for the columns so as to form, from an element v included in the initial information, a block of sx*sy elements v,
  l) Obtaining said information to be inserted from the intermediate information, said step of obtaining comprising, for at least one said block of the intermediate information,
    generating a sequence of symbols representative of a noise, the sequence of symbols comprising as many of the symbols as there are said elements in said block, each of the symbols of the sequence corresponding to one of said elements in said block, at least one of the symbols being non-zero, such that a result of a predetermined function applied to said symbols is equal to a chosen value,
    adding each said symbol to the corresponding element of said block, and
  m) inserting said obtained information into the first image.

11. A device for extracting information formed of a plurality of elements comprising N0 rows and M0 columns, inserted into an image comprising N2 rows×M2 columns of elements using the insertion method according to claim 1, N0, M0, N2 and M2 being non-zero integers, such that N2>N0 and M2>M0, the device being configured to implement the following steps:
  n) obtaining, from said image, a new image comprising N3 rows and M3 columns of elements, with:
  N3≥N2 and M3≥M2, and
  N3=nx·N0 and M3=ny·M0,
    N3 and M3 being non-zero positive integers, nx and ny being integers greater than 1, the elements of said new image being organized into blocks,
  o) obtaining a reduced image from the new image, the reduced image comprising N0 rows×M0 columns of elements, each element of the reduced image being obtained from the elements of a corresponding block in the new image, and for each respective element of the reduced image to be obtained:
    determining a value of said respective element by applying said predetermined function to values of the elements of said block in the new image corresponding to said respective element, the value of said respective element being the result of application of the predetermined function, and
  p) extracting the information from the reduced image.

12. The method according to claim 9, wherein the predetermined function is a measure of central tendency.

13. The method according to claim 9, wherein the predetermined function is the median.

14. The method according to claim 9, wherein the predetermined function is the average.

15. The method according to claim 9, wherein the chosen value is equal to zero, kx or ky being greater than or equal to 2.

16. The method according to claim 11, wherein the predetermined function is a measure of central tendency.

17. The method according to claim 11, wherein the predetermined function is the median.

18. The method according to claim 11, wherein the predetermined function is the average.

19. The method according to claim 11, wherein the chosen value is equal to zero, kx or ky being greater than or equal to 2.

* * * * *